(12) United States Patent
Pourrezaei Khaligh et al.

(10) Patent No.: US 10,173,722 B2
(45) Date of Patent: Jan. 8, 2019

(54) SYSTEM AND METHOD FOR DETERMINING A HITCH ANGLE BASED ON AN INPUT FROM A SENSOR AND A KINEMATIC MODEL OF A VEHICLE AND A TRAILER, AND FOR CONTROLLING THE VEHICLE BASED ON THE HITCH ANGLE

(71) Applicant: GM Global Technology Operations LLC, Detroit, MI (US)

(72) Inventors: Sepehr Pourrezaei Khaligh, North York (CA); Akram M. Abdel-Rahman, Ajax (CA); Anston Emmanuel, Toronto (CA); Grant L. Meade, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 153 days.

(21) Appl. No.: 15/343,687

(22) Filed: Nov. 4, 2016

(65) Prior Publication Data
US 2018/0127024 A1 May 10, 2018

(51) Int. Cl.
*B62D 15/00* (2006.01)
*G01S 15/00* (2006.01)
*B60D 1/00* (2006.01)
*B62D 13/00* (2006.01)
*B60W 30/00* (2006.01)
(Continued)

(52) U.S. Cl.
CPC ........... *B62D 13/025* (2013.01); *B60D 1/245* (2013.01); *B60D 1/246* (2013.01); *B60D 1/62* (2013.01); *B62D 13/06* (2013.01); *B62D 15/021* (2013.01); *B62D 15/023* (2013.01); *B62D 15/029* (2013.01); *B62D 15/0285* (2013.01); *G01S 15/931* (2013.01); *G01S 2015/938* (2013.01)

(58) Field of Classification Search
CPC ........ B62D 13/00; B62D 13/025; B62D 1/00; B62D 1/246; B62D 15/00; B62D 15/021; B62D 15/029; G01S 15/931; G01S 15/938; B60W 30/00; B60W 30/045; B60W 30/06
See application file for complete search history.

(56) References Cited

U.S. PATENT DOCUMENTS 5,512,904 A * 4/1996 Bennett ................... G01C 21/28
                                                            342/357.32
5,579,228 A * 11/1996 Kimbrough .............. B60D 1/06
                                                              180/14.6

(Continued)

*Primary Examiner* — Yonel Beaulieu

(57) ABSTRACT

A system according to the present disclosure includes an estimated hitch angle module, a measured hitch angle module, a corrected hitch angle module, and at least one of a driver assist module and an actuator control module. The estimated hitch angle module estimates a hitch angle, which is an angle between a longitudinal axis of a vehicle and a longitudinal axis of a trailer that is attached to the vehicle. The measured hitch angle module determines a measured hitch angle based on an input from a sensor. The corrected hitch angle module determines a corrected hitch angle based on the estimated and measured hitch angles. The driver assist module controls a user interface device to assist a driver of the vehicle based on the corrected hitch angle. The actuator control module controls an actuator of at least one of the vehicle and the trailer based on the corrected hitch angle.

20 Claims, 5 Drawing Sheets

(51) Int. Cl.
*B62D 13/02* (2006.01)
*B60D 1/24* (2006.01)
*B62D 15/02* (2006.01)
*G01S 15/93* (2006.01)
*B62D 13/06* (2006.01)
*B60D 1/62* (2006.01)

(56) References Cited

U.S. PATENT DOCUMENTS

| | | | | |
|---|---|---|---|---|
| 6,292,094 B1* | 9/2001 | Deng | | B62D 7/159 340/431 |
| 8,886,400 B2* | 11/2014 | Kossira | | B60D 1/06 701/36 |
| 9,037,312 B2* | 5/2015 | Rhode | | B60T 8/1708 340/431 |
| 9,393,996 B2* | 7/2016 | Goswami | | B62D 13/005 |
| 2004/0019418 A1* | 1/2004 | Lu | | B60G 17/0162 701/38 |
| 2013/0179038 A1* | 7/2013 | Goswami | | B62D 13/005 701/42 |
| 2014/0210456 A1* | 7/2014 | Crossman | | B62D 13/06 324/207.2 |
| 2014/0249723 A1* | 9/2014 | Pilutti | | B62D 15/027 701/42 |
| 2014/0297129 A1* | 10/2014 | Lavoie | | B62D 13/06 701/41 |
| 2014/0303849 A1* | 10/2014 | Hafner | | B62D 13/06 701/42 |
| 2014/0358417 A1* | 12/2014 | Lavoie | | G01C 21/165 701/300 |
| 2014/0358424 A1* | 12/2014 | Lavoie | | G01C 21/3676 701/428 |
| 2014/0358429 A1* | 12/2014 | Shutko | | G01C 21/3647 701/458 |
| 2015/0057903 A1* | 2/2015 | Rhode | | B60T 8/1708 701/70 |
| 2016/0039456 A1* | 2/2016 | Lavoie | | B62D 15/027 701/41 |
| 2016/0101810 A1* | 4/2016 | Xu | | B62D 15/0285 701/41 |
| 2016/0101811 A1* | 4/2016 | Kyrtsos | | B62D 13/06 701/25 |
| 2018/0001928 A1* | 1/2018 | Lavoie | | B62D 13/06 |
| 2018/0134314 A1* | 5/2018 | Lavoie | | B60D 1/62 |

* cited by examiner

SYSTEM AND METHOD FOR DETERMINING A HITCH ANGLE BASED ON AN INPUT FROM A SENSOR AND A KINEMATIC MODEL OF A VEHICLE AND A TRAILER, AND FOR CONTROLLING THE VEHICLE BASED ON THE HITCH ANGLE

FIELD

The present disclosure relates to systems and methods for determining a hitch angle based on an input from a sensor and a kinematic model of a vehicle and a trailer, and for controlling the vehicle based on the hitch angle.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicle control systems have been developed to assist a driver of a vehicle towing a trailer. Such vehicle control systems may be referred to as driver assistance systems. Examples of driver assistance systems include a trailer backup knob system, a trailer reverse trajectory display system, a jackknifing detection system, a jackknifing prevention system, and a trailer sway alert system. A trailer backup knob system provides guidance to the driver as the driver uses a knob to turn the vehicle while the vehicle and the trailer are travelling in reverse. For example, the trailer backup knob system may use an electronic display to show the current position of the trailer and a target position of the trailer.

A trailer reverse trajectory display system includes an electronic display that displays the trajectory of the vehicle and/or the trailer as the vehicle and trailer are travelling in reverse. A jackknifing detection system detects when the vehicle and the trailer are likely to jackknife. Jackknifing occurs when the hitch angle (i.e., the angle between the longitudinal axis of the trailer and the longitudinal axis of the vehicle) becomes so great that the trailer contacts the vehicle. A jackknifing prevention system automatically controls the vehicle to prevent the vehicle and the trailer from jackknifing.

SUMMARY

A system according to the present disclosure includes an estimated hitch angle module, a measured hitch angle module, a corrected hitch angle module, and at least one of a driver assist module and an actuator control module. The estimated hitch angle module estimates a hitch angle, which is an angle between a longitudinal axis of a vehicle and a longitudinal axis of a trailer that is attached to the vehicle. The measured hitch angle module determines a measured hitch angle based on an input from a sensor. The corrected hitch angle module determines a corrected hitch angle based on the estimated and measured hitch angles. The driver assist module controls a user interface device to assist a driver of the vehicle based on the corrected hitch angle. The actuator control module controls an actuator of at least one of the vehicle and the trailer based on the corrected hitch angle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Some driver assistance systems determine the hitch angle and control the vehicle based on the hitch angle that is determined. The hitch angle may be determined based on an input from a camera. In one example, vision-based ranging is used to determine multiple distances from the rear end of the vehicle to the front end of the trailer, and these distances are used to determine the hitch angle. However, vision-based systems require significant processing power at a high cost, and the performance of vision-based systems is limited by light conditions.

A vehicle control system according to the present disclosure determines the hitch angle using both a kinematic model and an input from one or more sensors, and assists a driver based on the hitch angle that is determined. In one example, the vehicle control system determines a corrected hitch angle based on a measured hitch angle and an estimated hitch angle, and assists the driver based on the corrected hitch angle. In another example, the vehicle control system determines the corrected hitch angle based on the measured and estimated hitch angles using a Kalman filter.

The vehicle control system determines the estimated hitch angle based on the steer angle of the vehicle and the speed of the vehicle using a kinematic model of the vehicle and the trailer. The vehicle control system determines the measured hitch angle based on inputs from two or more ultrasonic sensors. Determining the hitch angle using both the kinematic model and the ultrasonic sensor inputs is a low-cost, accurate, and reliable way of determining the hitch angle relative to vision-based systems.

Figure 1:
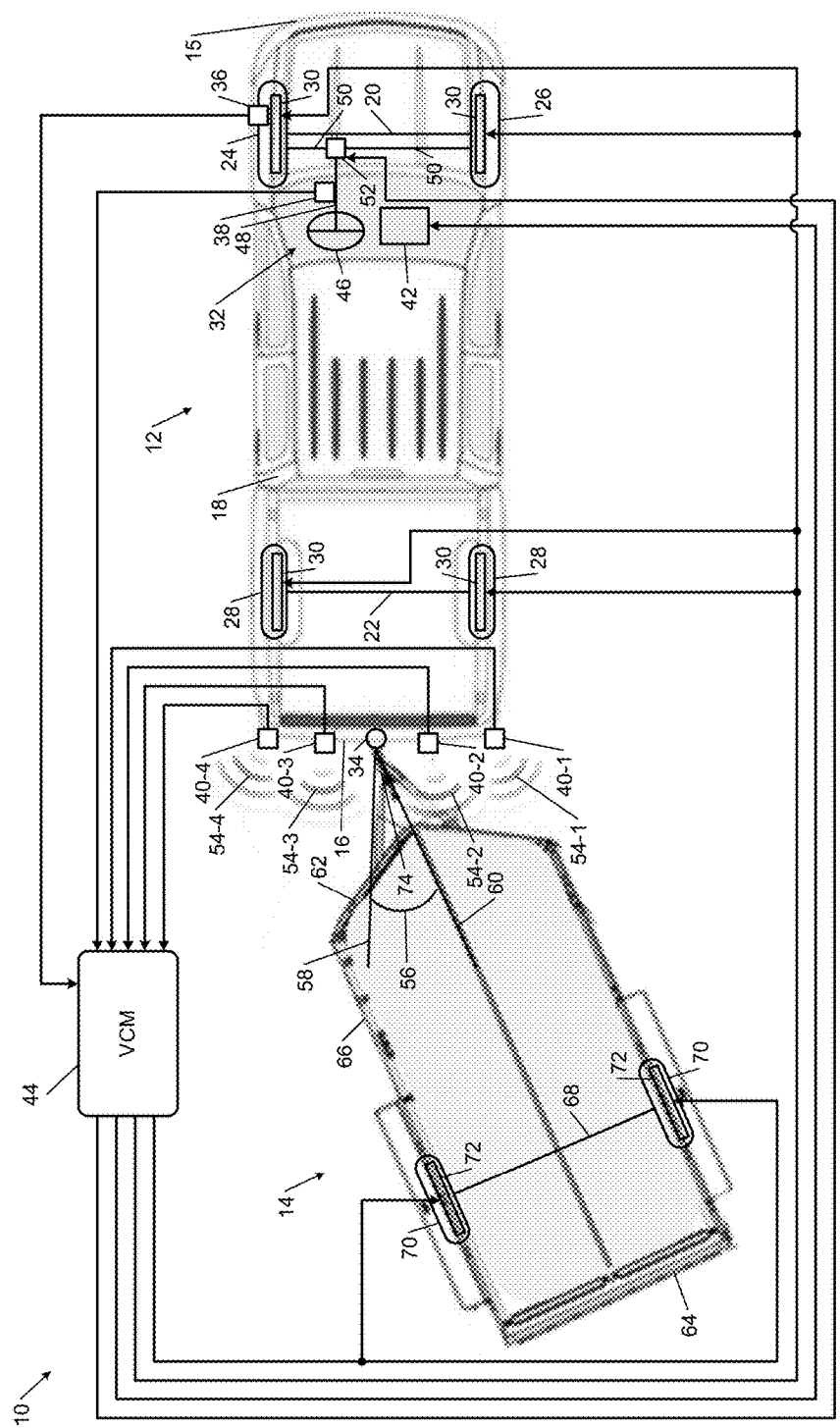
FIG. 1 is a schematic of an example vehicle system according to the principles of the present disclosure.

Referring now to FIG. 1, a vehicle system 10 includes a vehicle 12 and a trailer 14. The vehicle 12 has a front end 15 and a rear end 16. The vehicle 12 includes a frame or body 18, a front axle 20, a rear axle 22, a left front wheel 24, a right front wheel 26, rear wheels 28, friction brakes 30, a steering system 32, and a trailer hitch 34. The vehicle 12 further includes a wheel speed sensor 36, a steering wheel angle sensor 38, two or more ultrasonic sensors 40, a user interface device 42, and a vehicle control module (VCM) 44.

The front axle 20 may refer to one or more shafts that extend between and are rotatably coupled to the left and right front wheels 24 and 26. Alternatively, the front axle 20 may simply refer the left and right front wheels 24 and 26 when, for example, the front wheels 24 and 26 are attached to the frame or body 18 using an independent suspension (not shown). Similarly, the rear axle 22 may refer to one or more shafts that extend between and are rotatably coupled to the rear wheels 28, or the rear axle 22 may simply refer the rear wheels 28.

The friction brakes 30 are mounted to the left and right front wheels 24 and 26 and to the rear wheels 28. The friction brakes 30 resist rotation of the wheels 24, 26, and 28 when the friction brakes 30 are applied. The friction brakes 30 may include drum brakes and/or disc brakes, and may include electrohydraulic actuators and/or electromechanical actuators that press a brake pad against a brake disc and/or drum when the friction brakes 30 are applied.

The steering system 32 is operable to turn the left and right front wheels 24 and 26 and thereby turn the vehicle 12. The steering system 32 includes a steering wheel 46, a steering column 48, one or more steering linkages 50, and a steering actuator 52. A driver rotates the steering wheel 46 to turn the vehicle 12 left or right. The steering column 48 is coupled to the steering wheel 46 so that the steering column 48 rotates when the steering wheel 46 is rotated. The steering column 48 may also be coupled to the steering linkages 50 so that rotation of the steering column 48 causes translation of the steering linkages 50. The steering linkages 50 are coupled to the left and right front wheels 24 and 26 so that translation of the steering linkages 50 turns the left and right front wheels 24 and 26.

The steering actuator 52 is coupled to the steering linkages 50 and is operable to translate the steering linkages 50 and thereby turn the left and right front wheels 24 and 26. The steering actuator 52 may be an electrohydraulic and/or electromechanical actuator. If the steering column 48 is coupled to the steering linkages 50, the steering actuator 52 may reduce the amount of effort that the driver must exert to turn the vehicle 12 left or right. In various implementations, the steering column 48 may not be coupled to the steering linkages 50, and the steering actuator 52 may translate the steering linkages 50 in response to an electronic signal that is generated based on the angular position of the steering wheel 46. When the steering actuator 52 is electronically controlled in this way, the steering system 32 may be referred to as a steer-by-wire system.

The wheel speed sensor 36 is mounted to the left front wheel 24 and measures the speed of the left front wheel 24. Although the wheel speed sensor 36 is shown mounted to the left front wheel 24, the wheel speed sensor 36 may measure the speed of another wheel of the vehicle 12. In various implementations, the vehicle 12 may include multiple wheel speed sensors to measure the speeds of multiple (e.g., all) wheels of the vehicle 12.

The steering wheel angle sensor 38 measures the angular position of the steering wheel 46 relative to a predetermined position. The steering wheel 46 may be in the predetermined position when the vehicle 12 is traveling in a straight line. The steering wheel angle sensor 38 may be mounted to the steering column 48 and may include a Hall Effect sensor that measures the angular position of a shaft that is disposed within the steering column 48 and rotatably coupled to the steering wheel 46.

The ultrasonic sensors 40 include a first ultrasonic sensor 40-1, a second ultrasonic sensor 40-2, a third ultrasonic sensor 40-3, and a fourth ultrasonic sensor 40-4. The first ultrasonic sensor 40-1 transmits a first ultrasonic wave 54-1 in a direction toward the trailer 14 and receives the ultrasonic wave 54-1 after the ultrasonic wave 54-1 is reflected back to the ultrasonic sensor 40-1 by the trailer 14. The first ultrasonic sensor 40-1 measures a first period from a first time when the first ultrasonic wave 54-1 is transmitted to a second time when the ultrasonic wave 54-1 is received. The second ultrasonic sensor 40-2 transmits a second ultrasonic wave 54-2 in a direction toward the trailer 14 and receives the ultrasonic wave 54-2 after the ultrasonic wave 54-2 is reflected back to the ultrasonic sensor 40-2 by the trailer 14. The second ultrasonic sensor 40-2 measures a second period from a third time when the second ultrasonic wave 54-2 is transmitted to a fourth time when the ultrasonic wave 54-2 is received.

The third ultrasonic sensor 40-3 transmits a third ultrasonic wave 54-3 in a direction toward the trailer 14 and receives the ultrasonic wave 54-3 after the ultrasonic wave 54-3 is reflected back to the ultrasonic sensor 40-3 by the trailer 14. The third ultrasonic sensor 40-3 measures a third period from a fifth time when the third ultrasonic wave 54-3 is transmitted to a sixth time when the ultrasonic wave 54-3 is received. The fourth ultrasonic sensor 40-4 transmits a fourth ultrasonic wave 54-4 in a direction toward the trailer 14 and receives the ultrasonic wave 54-4 after the ultrasonic wave 54-4 is reflected back to the ultrasonic sensor 40-4 by the trailer 14. The fourth ultrasonic sensor 40-4 measures a fourth period from a seventh time when the fourth ultrasonic wave 54-4 is transmitted to an eighth time when the ultrasonic wave 54-4 is received.

The user interface device 42 may include an electronic display (e.g., a touchscreen) that is within the view of the driver and is operable to display text and/or images. In addition, the user interface device 42 may include a heads-up display (HUD) that, for example, projects text and/or images onto a windshield (not shown) of the vehicle 12. Further, the user interface device 42 may include one or more vibrators mounted to, for example, the steering wheel 46 and/or the driver's seat (not shown) to provide haptic feedback to the driver. Moreover, the user interface device 42 may include a speaker that is operable to generate a sound or audible message within the vehicle 12.

The VCM 44 estimates a hitch angle 56 (i.e., an angle between a longitudinal axis 58 of the vehicle 12 and a longitudinal axis 60 of the trailer 14) and assists the driver in driving the vehicle 12 based on the estimated hitch angle. The VCM 44 may assist the driver by controlling the user interface device 42 to instruct the driver when to turn and/or brake the vehicle 12, which direction to turn the vehicle 12, and/or how much to turn and/or brake the vehicle 12. Additionally or alternatively, the VCM 44 may assist the driver by automatically turning and/or decelerating the vehicle 12 (e.g., by applying the friction brakes 30 and/or turning the left and right front wheels 24 and 26 independent of an input from the driver). The VCM 44 may automatically turn and/or decelerate the vehicle 12 in order to prevent jackknifing.

The VCM 44 estimates the hitch angle 56 based on a steer angle of the vehicle 12 and the speed of the vehicle 12. The VCM 44 also determines a measured hitch angle based on the periods measured by the ultrasonic sensors 40. The VCM 44 then determines a corrected hitch angle based on the estimated and measured hitch angles, and assists the driver in driving the vehicle based on the corrected hitch angle.

The trailer 14 has a front end 62 and a rear end 64. The ultrasonic sensors 40 may transmit the ultrasonic waves 54-1, 54-2, 54-3, and 54-4 in a direction toward the front end 62 of the trailer 14 when measuring the first, second, third, and fourth periods. The trailer 14 includes a frame or body 66, an axle 68, wheels 70, friction brakes 72, and a tongue 74. Although the trailer 14 is depicted as a two-wheel trailer, the principles of the present application apply to a trailer having more than two wheels. The axle 68 may refer to one or more shafts that extend between and are rotatably coupled to the wheels 70, or the axle 68 may simply refer the wheels 70.

The friction brakes 72 are mounted to the wheels 70 and resist rotation of the wheels 70 when the friction brakes 72 are applied. The friction brakes 72 may include drum brakes and/or disc brakes, and may include electrohydraulic actuators and/or electromechanical actuators that press a brake pad against a brake disc and/or drum when the friction brakes 72 are applied. The tongue 74 may be placed onto the trailer hitch 34 of the vehicle 12 to couple the trailer 14 to the vehicle 12. For example, the trailer hitch 34 may include a ball, and the tongue 74 may include a socket that receives and latches onto the ball of the trailer hitch 34 to couple the trailer 14 to the vehicle 12.

As discussed above, the VCM 44 may assist the driver by automatically decelerating the vehicle 12, which may be accomplished applying the friction brakes 30 of the vehicle 12. Of course, when the trailer 14 is attached to the vehicle 12, decelerating the vehicle 12 decelerates the trailer 14 and vice versa. Thus, instead of or in addition to applying the friction brakes 30 of the vehicle 12 independent of an input from the driver, the VCM 44 may automatically decelerate the vehicle 12 by applying the friction brakes 72 of the trailer 14 independent of an input from the driver.

Figure 2:
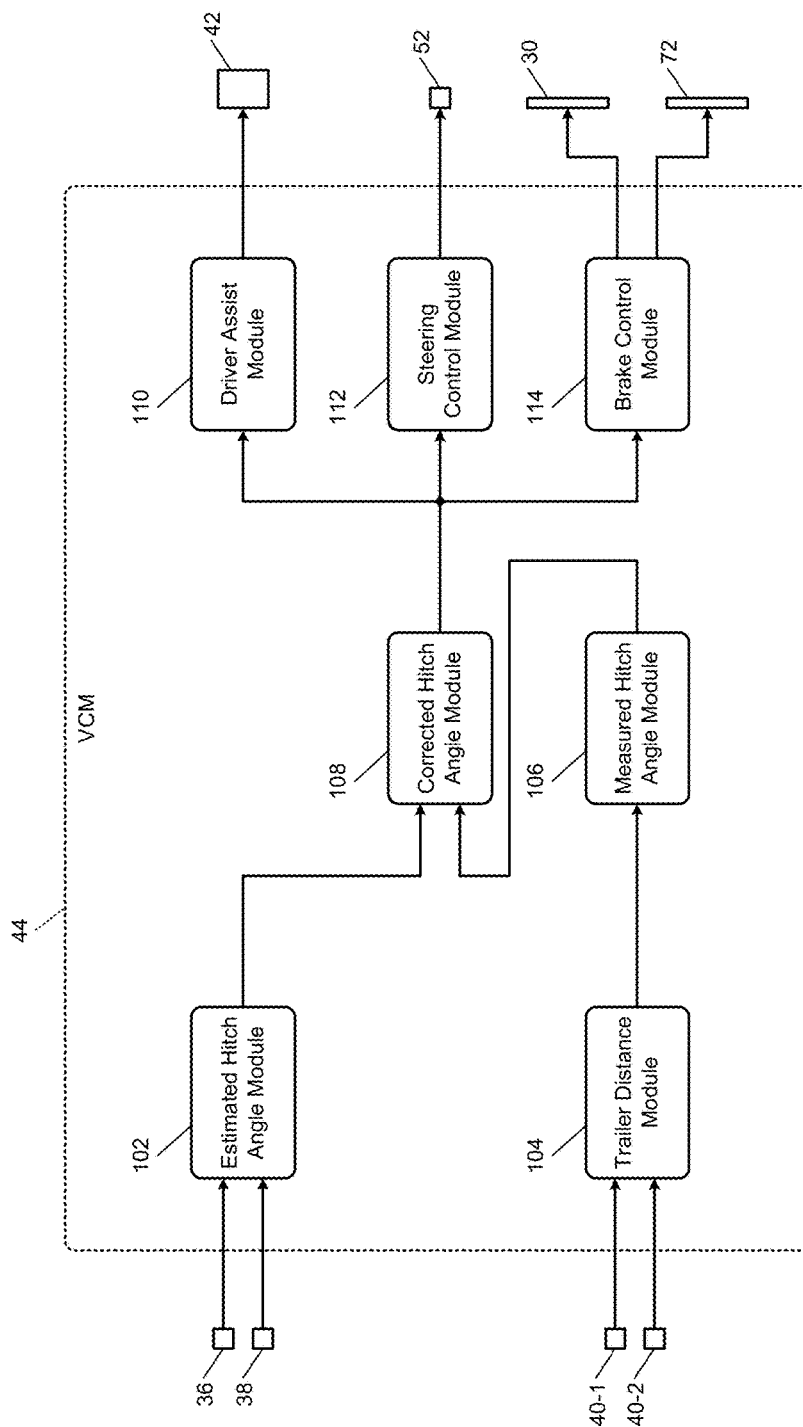
FIG. 2 is a functional block diagram of an example vehicle control system according to the principles of the present disclosure.

Referring now to FIG. 2, an example implementation of the VCM 44 includes an estimated hitch angle module 102, a trailer distance module 104, a measured hitch angle module 106, and a corrected hitch angle module 108. The estimated hitch angle module 102 estimates the hitch angle 56 based on the steer angle of the vehicle 12 and the speed of the vehicle 12. The estimated hitch angle module 102 receives the speed of the vehicle 12 from the wheel speed sensor 36.

Figure 3:
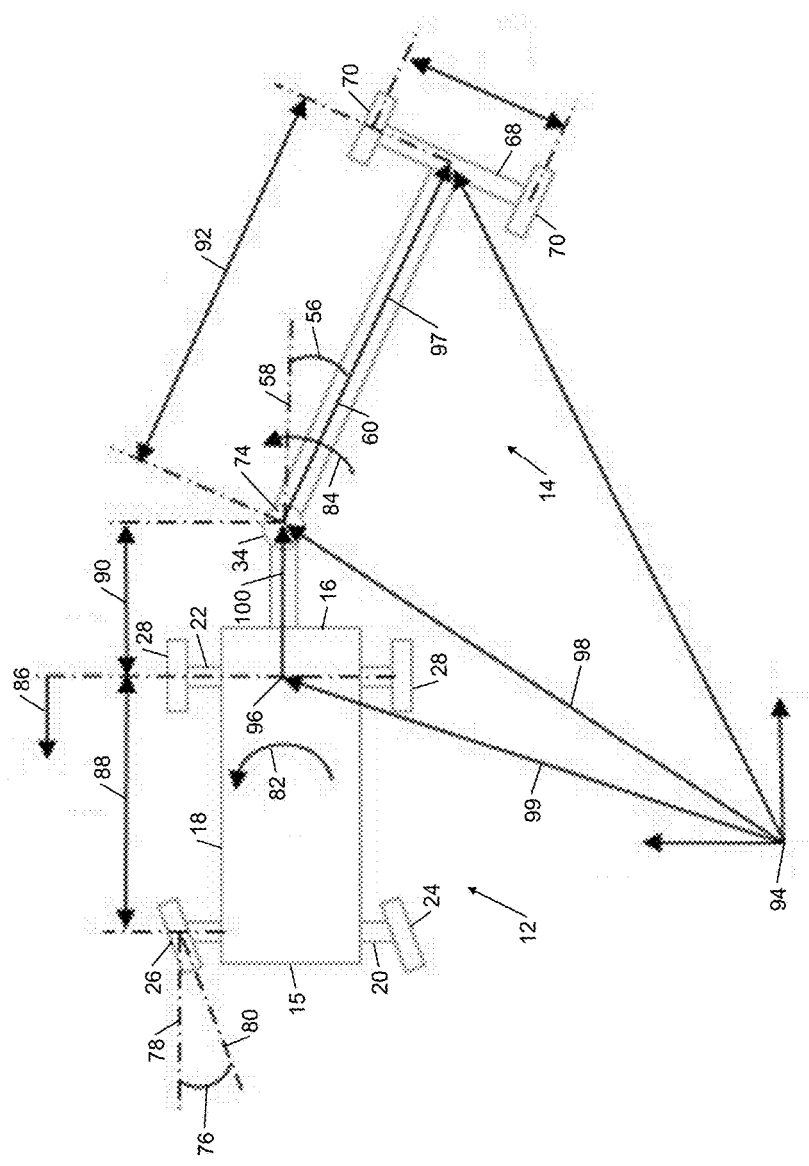
FIGS. 3 and 4 are schematics illustrating parameters associated with an example vehicle system according to the principles of the present disclosure.

The steer angle of the vehicle 12 is labelled 76 in FIG. 3 and is an angle between a line 78 parallel to the longitudinal axis 58 of the vehicle 12 and a vertical plane 80 extending through a steered wheel of the vehicle 12 (e.g., the left or right front wheels 24 or 26). The estimated hitch angle module 102 determines the steer angle 76 based on the steering wheel angle measured by the steering wheel angle sensor 38. For example, the estimated hitch angle module 102 may multiply the steering wheel angle by a conversion factor (i.e., a predetermined value) in order to obtain the steer angle 76.

The estimated hitch angle module 102 estimates the hitch angle 56 based on the steer angle 76 and the vehicle speed using a kinematic model of the vehicle 12 and the trailer 14. The estimated hitch angle module 102 may estimate a rate of change in the hitch angle 56 using the kinematic model, and integrate the estimated rate of change with respect to a sampling period associated with the estimated rate of change to obtain the estimated hitch angle. For example, the estimated hitch angle module 102 may estimate the rate of change in the hitch angle 56 using a relationship such as $$\dot{\theta} = \Omega - \omega = -\frac{V_C}{l_{tr}}\sin\theta_{prev} - \frac{V_C}{l_w}\tan\delta\left(\frac{l_h}{l_{tr}}\cos\theta_{prev} + 1\right), \quad (1)$$

where $\dot{\theta}$ is the estimated rate of change in the hitch angle 56, $\Omega$ is the angular velocity of the trailer 14, $\omega$ is the angular velocity of the vehicle 12, $V_c$ is the speed of the vehicle 12, $\theta_{prev}$ is a previous estimate of the hitch angle 56, $\delta$ is the steer angle 76, $l_w$ is the wheelbase of the vehicle 12, $l_h$ is the distance from the rear axle 22 of the vehicle 12 to the trailer hitch 34 of the vehicle 12, and $l_{tr}$ is the distance from the tongue 74 of the trailer 14 to the axle 68 of the trailer 14. The angular velocity of the vehicle 12 is indicated at 82 in FIG. 3, the angular velocity of the trailer 14 is indicated at 84 in FIG. 3, the speed of the vehicle 12 is indicated at 86 in FIG. 3, the wheelbase of the vehicle 12 is indicated at 88 in FIG. 3, the distance from the rear axle 22 of the vehicle 12 to the trailer hitch 34 of the vehicle 12 is indicated at 90 in FIG. 3, and the distance from the tongue 74 of the trailer 14 to the axle 68 of the trailer 14 is indicated at 92 in FIG. 3.

The previous estimate of the hitch angle 56 may be the most recent estimation of the hitch angle 56. The sampling period with respect to which the estimated rate of change in the hitch angle 56 is integrated may be the period from the time of the most recent estimation of the hitch angle 56 to the current time (i.e., the time of the current estimation of the hitch angle 56).

Relationship (1) may be derived from the following three relationships:

$$\dot{\vec{Z}} = \vec{\Omega} \times \vec{Z}; \quad (2)$$

$$\dot{\vec{r}} = \dot{\vec{P}} + \vec{\omega} \times \vec{n} = -V_C\frac{\vec{n}}{|\vec{n}|} + \vec{\omega} \times \vec{n}; \text{ and} \quad (3)$$

$$(\dot{\vec{r}} + \dot{\vec{Z}}) \times \vec{Z} = 0, \quad (4)$$

where $\vec{\Omega}$ is the angular velocity of the trailer 14, $\vec{Z}$ is a vector from the tongue 74 of the trailer 14 to the axle 68 of the trailer 14, $\dot{\vec{Z}}$ is a rate of change in the vector $\vec{Z}$, $\dot{\vec{r}}$ is a rate of change in a vector $\vec{r}$ from a ground reference point 94 to the trailer hitch 34 of the vehicle 12, $\dot{\vec{P}}$ is a rate of change in a vector $\vec{P}$ from the ground reference point 94 to an intersection 96 between the rear axle 22 of the vehicle 12 and the longitudinal axis 58 of the vehicle 12, $\vec{\omega}$ is the angular velocity of the vehicle 12, and $\vec{n}$ is a vector from the rear axle 22 of the vehicle 12 to the trailer hitch 34 of the vehicle 12. The vector $\vec{Z}$ is indicated at 97 in FIG. 3, the vector $\vec{r}$ is indicated at 98 in FIG. 3, the vector $\vec{P}$ is indicated at 99 in FIG. 3, and the vector $\vec{n}$ is indicated at 100 in FIG. 3. Relationships (2) and (3) assume that the wheels 24, 26, and 28 of the vehicle 12 are not slipping.

With continued reference to FIG. 2, the trailer distance module 104 determines the distances from the ultrasonic sensors 40 to the trailer 14 based on the periods measured by the ultrasonic sensors 40. In one example, with additional reference to FIG. 4, the trailer distance module 104 determines a first distance 150 between the first ultrasonic sensor 40-1 and the front end 62 of the trailer 14 based on the first period measured by the first ultrasonic sensor 40-1. The trailer distance module 104 may set the first distance equal to a product of the first period and the speed of the first ultrasonic wave 54-1 transmitted by the first ultrasonic sensor 40-1.

In another example, the trailer distance module 104 determines a second distance 152 between the first ultrasonic sensor 40-1 and the front end 62 of the trailer 14 based on the second period measured by the second ultrasonic sensor 40-2. The trailer distance module 104 may set the second distance equal to a product of the second period and the speed of the second ultrasonic wave 54-2 transmitted by the second ultrasonic sensor 40-2. The speed of the first and second ultrasonic waves 54-1 and 54-2 may be predetermined.

Figure 4:
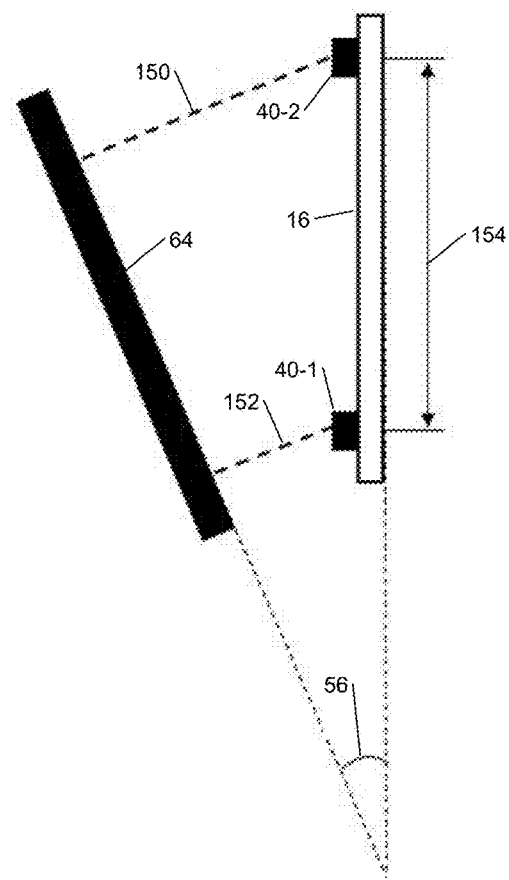

With continued reference to FIGS. 2 and 4, the measured hitch angle module 106 determines the hitch angle 56 based on the distances from the ultrasonic sensors 40 to the trailer 14 and the distances between the ultrasonic sensors 40. The value of the hitch angle 56 determined by the measured hitch angle module 106 is referred to herein as the measured hitch angle. In one example, the measured hitch angle module 106 determines the measured hitch angle using a relationship such as $$\theta = \sin^{-1}\left(\frac{D_2 - D_1}{C}\right), \quad (5)$$

where θ is the measured hitch angle, $D_1$ is the first distance from the first ultrasonic sensor 40-1 to the front end 62 of the trailer 14, $D_2$ is the second distance from the second ultrasonic sensor 40-2 to the front end 62 of the trailer 14, and C is a distance 154 between the first and second ultrasonic sensors 40-1 and 40-2.

In various implementations, the measured hitch angle module 106 may determine the measured hitch angle based on an input from another type of sensor such as a camera and/or radar sensors mounted to the rear end 16 of the vehicle 12. For example, the measured hitch angle module 106 may use images generated by the camera and vision-based ranging to determine various distances from the rear end 16 of the vehicle 12 to the front end 62 of the trailer 14. In another example, the measured hitch angle module 106 may determine various distances from the rear end 16 of the vehicle 12 to the front end 62 of the trailer 14 based on the travel times of radar beams transmitted and received by the radar sensors. In either example, the measured hitch angle module 106 may determine the measured hitch angle based on the distances from the vehicle 12 to the trailer 14 as discussed above with reference to FIG. 4.

The corrected hitch angle module 108 determines the hitch angle 56 based on the estimated and measured hitch angles determined by the estimated and measured hitch angle modules 102 and 104, respectively. The value of the hitch angle 56 determined by the corrected hitch angle module 108 is referred to herein as the corrected hitch angle. The corrected hitch angle module 108 may determine the corrected hitch angle based on the estimated and measured hitch angles using a Kalman filter such as an extended Kalman filter.

The Kalman filter is an optimization technique that minimizes errors introduced by model mismatch and noise. For example, the estimated hitch angle may exhibit error due to model mismatch when the wheels 24, 26, or 28 of the vehicle 12 slip since the kinematic model of the vehicle 12 and the trailer 14 discussed above assume that the wheels 24, 26, and 28 are not slipping. In another example, the measured hitch angle may exhibit error due to noise in signals generated by the ultrasonic sensors 40 which indicate the periods measured by the ultrasonic sensors. The Kalman filter minimizes these errors. Thus, the difference between the corrected hitch angle and the actual value of the hitch angle 56 is less than the difference between the estimated hitch angle and the actual hitch angle and less than the difference between the measured hitch angle and the actual hitch angle.

In various implementations, the corrected hitch angle module 108 may set the corrected hitch angle equal to a weighted average of the estimated and measured hitch angles. For example, the corrected hitch angle module 108 may assign a first weighting value to the estimated hitch angle and a second weighting value to the measure hitch angle. The corrected hitch angle module 108 may then set the corrected hitch angle equal to a sum of (1) the product of the first weighting value and the estimated hitch angle, and (2) the produce of the second weighting value and the measured hitch angle. The sum of the first and second weighting values may be equal to one.

The example implementation of the VCM 44 shown in FIG. 2 further includes a driver assist module 110, a steering control module 112, and a brake control module 114. The driver assist module 110 controls the user interface device 42 based on the corrected hitch angle in order to assist the driver in driving the vehicle 12. The driver assist module 110 may control the user interface device 42 based on the corrected hitch angle for trailer backup knob guidance, trailer reverse trajectory display, jackknife detection, and/or trailer sway alerts. For example, the driver assist module 110 may control the user interface device 42 to vibrate the steering wheel 46 and/or the driver's seat in order to warn the driver of potential jackknifing when the corrected hitch angle is greater than a predetermined angle.

The steering control module 112 controls the steering actuator 52 based on the corrected hitch angle in order to assist the driver by automatically steering the vehicle 12 (e.g., by steering the vehicle 12 independent of an input from the driver such as the steering wheel angle measured by the steering wheel angle sensor 38). The steering control module 112 may control the steering actuator 52 based on the corrected hitch angle for jackknife prevention. For example, the steering control module 112 may control the steering actuator 52 to decrease the hitch angle 56 when the corrected hitch angle is greater than the predetermined angle.

The steering control module 112 may control the steering actuator 52 to decrease the hitch angle 56 by turning the left and right front wheels 24 and 26 of the vehicle 12 left or right. For example, if the vehicle 12 and the trailer 14 are travelling rearward in FIG. 1 and the hitch angle 56 is greater than the predetermined angle, the steering control module 112 may instruct the steering actuator 52 to turn the front wheels 24, 26 to the right. Turning the front wheels 24, 26 to the right may decrease the hitch angle 56 and thereby prevent the vehicle 12 and trailer 14 from jackknifing.

With continued reference to FIG. 2, the brake control module 114 controls the friction brakes 30 of the vehicle 12 and/or the friction brakes 72 of the trailer 14 based on the corrected hitch angle in order to assist the driver by automatically braking the vehicle 12 and/or the trailer 14 (e.g., by braking the vehicle 12 and/or the trailer 14 independent of an input from the driver such as a brake pedal position). The brake control module 114 may control the friction brakes 30 and/or 72 based on the corrected hitch angle for jackknife prevention. For example, the steering control module 112 may apply the friction brakes 30 and/or 72 to decelerate the vehicle 12 when the corrected hitch angle is greater than the predetermined angle. The steering control module 112 and/or the brake control module 114 may be referred to as an actuator control module.

Figure 5:
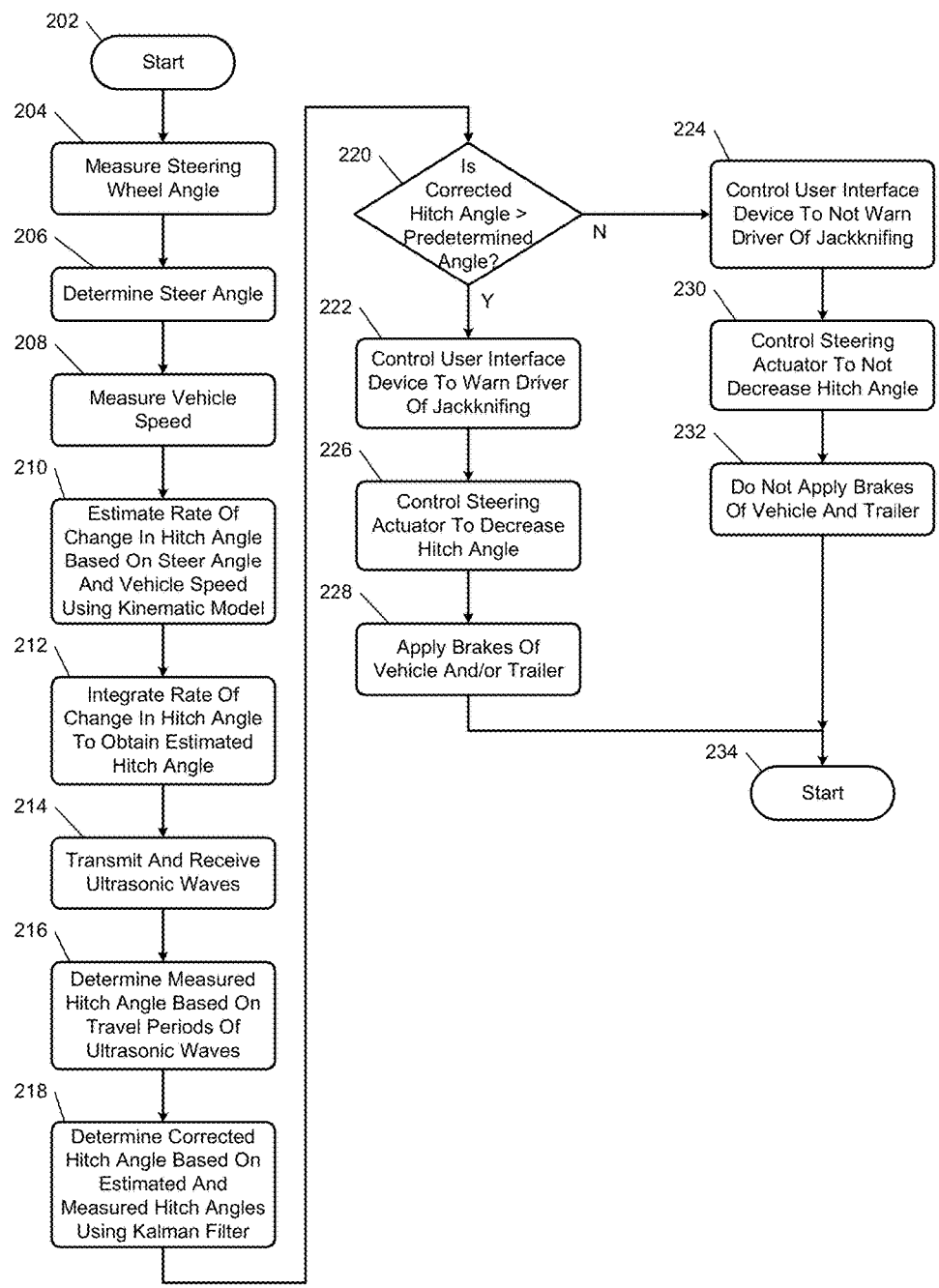
FIG. 5 is a flowchart illustrating an example vehicle control method according to the principles of the present disclosure.

Referring now to FIG. 5, a method for determining the hitch angle 56 based on the periods measured by the ultrasonic sensors and a kinematic model of the vehicle 12 and the trailer 14, and for controlling the vehicle 12 based on the hitch angle 56, begins at 202. At 204, the steering wheel angle sensor 38 measures the angular position of the steering wheel 46. At 206, the estimated hitch angle module 102 determines the steer angle of the vehicle 12 based on the steering wheel angle measured by the steering wheel angle sensor 38. At 208, the wheel speed sensor 36 measures the speed of the vehicle 12.

At 210, the estimated hitch angle module 102 estimates the rate of change in the hitch angle 56 based on the steer angle and the vehicle speed using the kinematic model of the vehicle 12 and the trailer 14. For example, the estimated hitch angle module 102 may estimate the rate of change in the hitch angle 56 using relationship (1) discussed above. At 212, the estimated hitch angle module 102 integrates the estimated rate of change in the hitch angle 56 with respect to the sampling period of the estimated hitch angle in order to obtain the estimated hitch angle.

At 214, the ultrasonic sensors 40 transmit and receive the ultrasonic waves 54-1 through 54-4. At 216, the measured hitch angle module 106 determines the measured hitch angle based on the travel periods of the ultrasonic waves 54-1 through 54-4. For example, the measured hitch angle module 106 may multiply the travel periods by a predetermined wave speed to obtain the distances form the ultrasonic sensors 40 to the trailer 14, and then determine the measured hitch angle based on the distances as discussed above with reference to FIG. 4.

At 218, the corrected hitch angle module 108 determines the corrected hitch angle based on the estimated and measured hitch angles using a Kalman filter. Additionally or alternatively, the corrected hitch angle module 108 may set the corrected hitch angle equal to a weighted average of the estimated and measured hitch angles as discussed above. At 220, the driver assist module 110, steering control module 112, and/or the brake control module 114 determine whether the corrected hitch angle is greater than the predetermined angle. If the corrected hitch angle is greater than the predetermined angle, the method continues at 222. Otherwise, the method continues at 224.

At 222, the driver assist module 110 controls the user interface device 42 to warn the driver of potential jackknifing. At 226, the steering control module 112 controls the steering actuator 52 to decrease the hitch angle 56. At 228, the brake control module 114 applies the friction brakes 30 of the vehicle 12 and/or the friction brakes 72 of the trailer 14 to decelerate the vehicle 12 and/or the trailer 14.

At 224, the driver assist module 110 controls the user interface device 42 to not warn the driver of potential jackknifing. At 230, the steering control module 112 controls the steering actuator 52 to not decrease the hitch angle 56. At 232, the brake control module 114 does not apply the friction brakes 30 of the vehicle 12 or the friction brakes 72 of the trailer 14. The method ends at 234.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
   an estimated hitch angle module that estimates a hitch angle, wherein the hitch angle is an angle between a longitudinal axis of a vehicle and a longitudinal axis of a trailer that is attached to the vehicle;
   a measured hitch angle module that determines a measured hitch angle based on an input from a sensor;
   a corrected hitch angle module that determines a corrected hitch angle based on the estimated hitch angle and the measured hitch angle; and
   at least one of:
      a driver assist module that controls a user interface device to assist a driver of the vehicle based on the corrected hitch angle; and
      an actuator control module that controls an actuator of at least one of the vehicle and the trailer based on the corrected hitch angle.

2. The system of claim 1 wherein the estimated hitch angle module determines the estimated hitch angle based on a speed of the vehicle and a steer angle of the vehicle, wherein the steer angle is an angle between the longitudinal axis of the vehicle and a vertical plane extending through a steered wheel of the vehicle.

3. The system of claim 2 wherein the estimated hitch angle module determines the estimated hitch angle based on the vehicle speed and the steer angle of the vehicle using a kinematic model of the vehicle and the trailer.

4. The system of claim 2 wherein the estimated hitch angle module:
   determines a rate of change in the estimated hitch angle based on the vehicle speed and the steer angle of the vehicle, and
   determines the estimated hitch angle by integrating the rate of change in the estimated hitch angle with respect to a sampling period associated with the rate of change in the estimated hitch angle.

5. The system of claim 4 wherein the estimated hitch angle module determines the rate of change in the estimated hitch angle further based on a previous value of the estimated hitch angle.

6. The system of claim 4 wherein the estimated hitch angle module determines the rate of change in the estimated hitch angle further based on a wheelbase of the vehicle, a distance between a rear axle of the vehicle and a trailer hitch of the vehicle, and a distance between a tongue of the trailer to a rear axle of the trailer.

7. The system of claim 1 wherein:
   the sensor includes a first ultrasonic sensor that transmits a first ultrasonic wave in a first direction toward the trailer and receives the first ultrasonic wave after the first ultrasonic wave is reflected back to the first ultrasonic sensor by the trailer; and
   the measured hitch angle module determines the measured hitch angle based on a first period from a first time when the first ultrasonic sensor transmits the first ultrasonic wave and a second time when the first ultrasonic sensor receives the first ultrasonic wave.

8. The system of claim 7 wherein:
   the sensor further includes a second ultrasonic sensor that transmits a second ultrasonic wave in a second direction toward the trailer and receives the second ultrasonic wave after the second ultrasonic wave is reflected back to the second ultrasonic sensor by the trailer; and
   the measured hitch angle module determines the measured hitch angle further based on a second period from a third time when the second ultrasonic sensor transmits the first ultrasonic wave and a fourth time when the second ultrasonic sensor receives the first ultrasonic wave.

9. The system of claim 8 further comprising a trailer distance module that:
determines a first distance between the first ultrasonic sensor and the trailer based on the first period; and
determines a second distance between the second ultrasonic sensor and the trailer based on the second period, wherein the measured hitch angle module determines the measured hitch angle based on the first and second distances.

10. The system of claim 1 wherein the corrected hitch angle determines the corrected hitch angle based on the estimated hitch angle and the measured hitch angle using a Kalman filter.

11. A method comprising:
estimating a hitch angle, wherein the hitch angle is an angle between a longitudinal axis of a vehicle and a longitudinal axis of a trailer that is attached to the vehicle;
determining a measured hitch angle based on an input from a sensor;
determining a corrected hitch angle based on the estimated hitch angle and the measured hitch angle; and
at least one of:
controlling a user interface device to assist a driver of the vehicle based on the corrected hitch angle; and
controlling an actuator of at least one of the vehicle and the trailer based on the corrected hitch angle.

12. The method of claim 11 further comprising determining the estimated hitch angle based on a speed of the vehicle and a steer angle of the vehicle, wherein the steer angle is an angle between the longitudinal axis of the vehicle and a vertical plane extending through a steered wheel of the vehicle.

13. The method of claim 12 further comprising determining the estimated hitch angle based on the vehicle speed and the steer angle of the vehicle using a kinematic model of the vehicle and the trailer.

14. The method of claim 12 further comprising:
determining a rate of change in the estimated hitch angle based on the vehicle speed and the steer angle of the vehicle, and
determining the estimated hitch angle by integrating the rate of change in the estimated hitch angle with respect to a sampling period associated with the rate of change in the estimated hitch angle.

15. The method of claim 14 further comprising determining the rate of change in the estimated hitch angle further based on a previous value of the estimated hitch angle.

16. The method of claim 14 further comprising determining the rate of change in the estimated hitch angle further based on a wheelbase of the vehicle, a distance between a rear axle of the vehicle and a trailer hitch of the vehicle, and a distance between a tongue of the trailer to a rear axle of the trailer.

17. The method of claim 11 wherein:
the sensor includes a first ultrasonic sensor that transmits a first ultrasonic wave in a first direction toward the trailer and receives the first ultrasonic wave after the first ultrasonic wave is reflected back to the first ultrasonic sensor by the trailer; and
the method further comprises determining the measured hitch angle based on a first period from a first time when the first ultrasonic sensor transmits the first ultrasonic wave and a second time when the first ultrasonic sensor receives the first ultrasonic wave.

18. The method of claim 17 wherein:
the sensor further includes a second ultrasonic sensor that transmits a second ultrasonic wave in a second direction toward the trailer and receives the second ultrasonic wave after the second ultrasonic wave is reflected back to the second ultrasonic sensor by the trailer; and
the method further comprises determining the measured hitch angle further based on a second period from a third time when the second ultrasonic sensor transmits the first ultrasonic wave and a fourth time when the second ultrasonic sensor receives the first ultrasonic wave.

19. The method of claim 18 further comprising:
determining a first distance between the first ultrasonic sensor and the trailer based on the first period;
determining a second distance between the second ultrasonic sensor and the trailer based on the second period; and
determining the measured hitch angle based on the first and second distances.

20. The method of claim 11 further comprising determining the corrected hitch angle based on the estimated hitch angle and the measured hitch angle using a Kalman filter.

* * * * *